Oct. 26, 1965  J. F. FINNEGAN  3,214,221
METHOD OF AND APPARATUS FOR STORING
AND PRESERVING GRANULAR MATERIAL
Filed Oct. 23, 1961  4 Sheets-Sheet 1

INVENTOR.
JAMES F. FINNEGAN
BY Ooms, McDougall
and Hersh
ATTORNEYS

Oct. 26, 1965   J. F. FINNEGAN   3,214,221
METHOD OF AND APPARATUS FOR STORING
AND PRESERVING GRANULAR MATERIAL
Filed Oct. 23, 1961   4 Sheets-Sheet 2

INVENTOR.
JAMES F. FINNEGAN
BY *Ooms, McDougall and Hersh*
ATTORNEYS

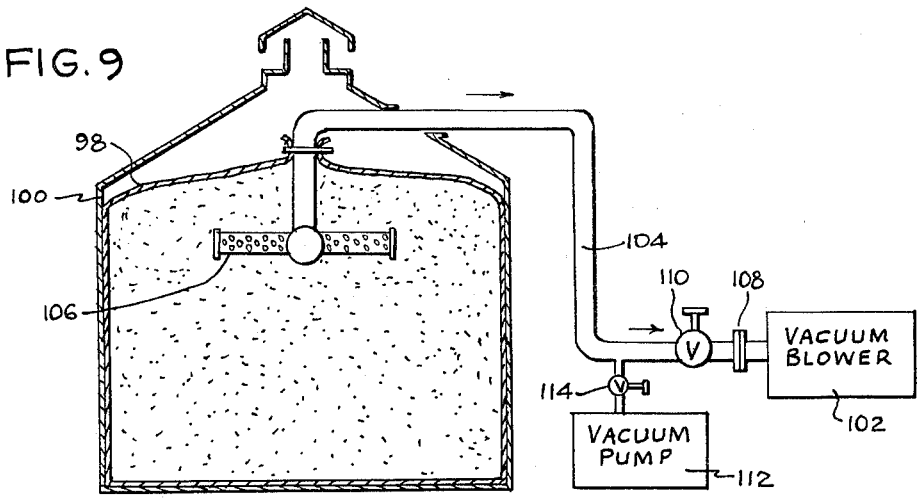
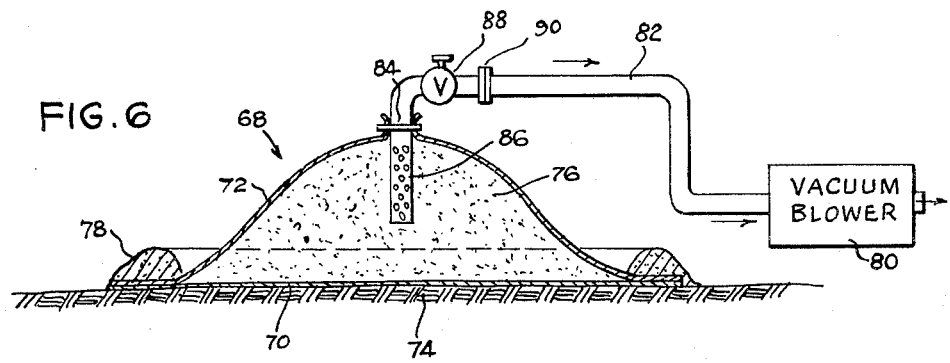
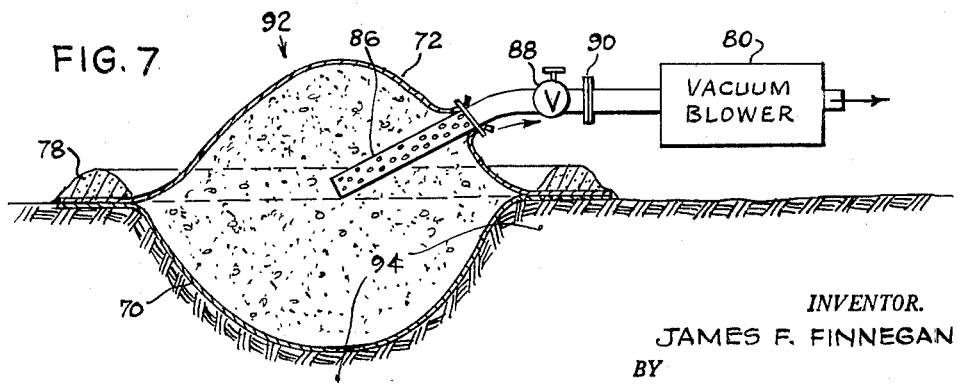

*INVENTOR.*
JAMES F. FINNEGAN

United States Patent Office 3,214,221
Patented Oct. 26, 1965

3,214,221
METHOD OF AND APPARATUS FOR STORING AND PRESERVING GRANULAR MATERIAL
James F. Finnegan, Aurora, Ill., assignor to DK Manufacturing Company, Batavia, Ill., a corporation of Illinois
Filed Oct. 23, 1961, Ser. No. 147,023
8 Claims. (Cl. 302—17)

This invention relates particularly to the storage of grain, such as wheat, corn, rye, oats and barley, for example, but is also applicable to the storage of granular or powdered materials generally, including fertilizers and chemicals, for example.

One object of the present invention is to store granular material in such a manner as to protect it from damage or deterioration due to rain, moisture, wind, fermentation, mold growth, action of other micro-organisms, insect infestation, attack by rodents, and contamination by radioactive fall-out.

A further object of the present invention is to store granular materials in containers made of thin limp flexible material, such as plastic film, for example, that is impervious to moisture and air.

Another object is to store granular materials very economically without any need to erect expensive permanent structures.

A further object is to utilize containers made of thin limp impervious material for storing granular materials on the ground, underground, or even under water, while fully protecting the granular material from rain, moisture, wind, insects and rodents.

Another object is to utilize containers made of limp impervious material as liners within structures which are not impervious or otherwise are not adequate or suitable in themselves for permanent storage of the granular material.

It is a further object of the present invention to store granular materials under a partial vacuum, yet at extremely low cost.

In accordance with the present invention, the grain or other granular material is stored in a container made of a thin limp flexible material, such as plastic film, for example, which is impervious to air and moisture. A partial vacuum is established and maintained in the container throughout substantially the entire period of storage. Due to the vacuum, the pressure of the surrounding atmosphere presses the limp container against the mass of granular material so that the granular material is compacted and rendered semi-rigid. The maintenance of the vacuum eliminates excess air from the container so that the amount of air in the container is reduced to an absolute minimum. In the case of grain, the natural respiration of the grain soon consumes most of the oxygen in the container, with the result that insects and micro-organisms are killed or rendered inactive so that the grain will be preserved for a long period of time. The reduction in the oxygen content can be accelerated by introducing an inert gas, such as carbon dioxide, into the container. The carbon dioxide may be introduced in the form of Dry Ice, which will quickly vaporize so as to displace oxygen from the container.

The compaction of the grain by the action of atmospheric pressure on the container also prevents any substantial circulation of air in the grain. Thus, moisture is not able to migrate or accumulate in the grain to such an extent that it might condense, due to temperature changes. The elimination of condensation in the grain prevents the development of wet spots in the mass of grain. In any such wet spots the grain would tend to spoil rapidly.

The limp flexible container may be used to store grain or other granular material on the ground, in which case the maintenance of the vacuum in the container presses the container against the granular material, so that the container is prevented entirely from fluttering, whipping or otherwise moving in the wind. In this way the container is protected from wind damage.

The maintenance of a partial vacuum in the limp bag or other container prevents any substantial damage by rodents, because it has been found that rodents will not gnaw through or enter the bag when a vacuum is maintained therein. This is apparently due to the hardness of the mass of grain, when compressed by atmospheric pressure, and the noise of inrushing of air when any small opening is made by a rodent. Rodents are frightened away by the noise of the inrushing air.

In some cases, the limp flexible impervious container may be utilized as a liner for a bin or other structure which is not sufficiently tight or strong to be adequate or suitable for permanent grain storage. The maintenance of the vacuum in the limp container causes the container to be supported by the surrounding atmospheric pressure. In this way, the structure is relieved of most of the weight of the granular material. Moreover, the flexible container, when rigidified by the maintenance of a vacuum therein, bridges over any openings in the bin or other structure.

The maintenance of the vacuum in the container rigidifies the container to such an extent that it is highly resistant to the impact of flying objects such as hailstones or wind-blown debris, for example. Under the impact of a flying object, the flexible container and the underlying mass of granular material give a little so that the force of the impact is absorbed without damage to the container.

The maintenance of the vacuum in the container makes it possible to bury the container under the earth and to remove the covering of earth from the container, all without damage to the container or the granular material contained therein.

While the vacuum is maintained in the container, it may be picked up and placed on a truck, railroad car or other vehicle for transportation to another location. The maintenance of the vacuum causes the container to maintain its shape, due to the force of atmospheric pressure on the container.

Further objects, features and advantages of the present invention will appear from the following description, taken with the accompanying drawings, in which:

FIG. 6 is an elevational section of a modified arrangement in which grain is stored in a pile between two sheets of flexible impervious material such as plastic film.

FIG. 7 is an elevational section of a modified arrangement, somewhat similar to that shown in FIG. 6, but in which the grain is stored partly below the ground level in a pit which is formed in the ground.

FIG. 9 is an elevational section showing a modified arrangement in which the grain or other granular material is stored in a bag or other limp container, taking the form of a liner within a bin or other structure.

Figure 1:
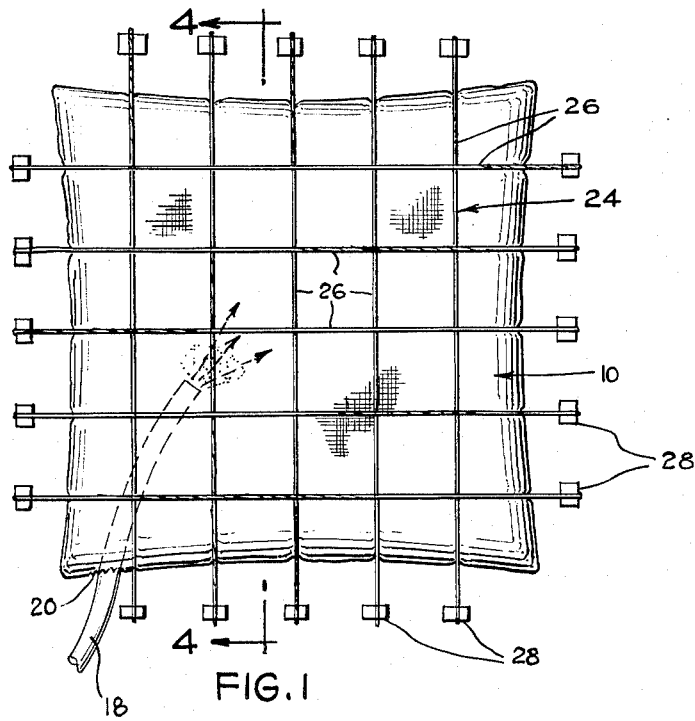
FIG. 1 is a somewhat diagrammatic plan view illustrating one advantageous procedure for filling a large limp bag with grain or other granular material.
Figure 2:
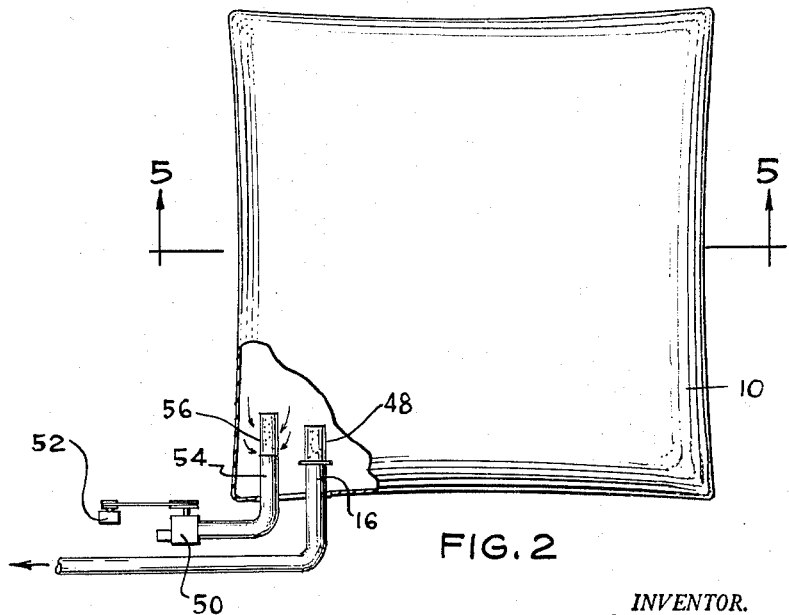
FIG. 2 is a view similar to FIG. 1 but showing an advantageous arrangement for withdrawing air from the storage bag and maintaining a partial vacuum therein while the grain is being stored.

FIGS. 1–5 illustrate an embodiment of the invention whereby a large quantity of grain or other granular material may be stored in a large limp impervious container 10 which may be supported on the surface of the ground. As shown, the container 10 is in the form of a bag, but it may be in the form of two sheets having their edges held together, or in any other suitable form. A pad 12 of sand or the like may be provided on the surface of the ground to level the ground and to protect the bag 10 from being punctured by any stones, sticks or the like that may be on the ground. The bag 10 may be made of thin inexpensive plastic film, or any other suitable limp flexible material, such as various fabrics, synthetic rubber, or the like. The material employed in the bag should be impervious to air and moisture. Thus, the bag 10 may be made of vinyl, polyethylene, or polypropylene plastic film, for example. Laminated films, having two or more laminations, may be used, if desired.

The bag 10 may be of virtually any desired size, according to the amount of grain that is to be stored in the bag. Thus, a bag which is 100 feet square will hold about 65,000 bushels of grain. A bag of this size or even larger is entirely practical. The illustrated bag 10 is generally pillow-shaped when filled with grain.

Various procedures may be employed to fill the plastic bag 10 with grain or other granular material. Thus, the grain may simply be dumped into the bag, mechanically or by hand. However, one advantageous technique is to blow the grain into the bag while it is inflated with air to provide working room in the bag. As shown to advantage in FIG. 4, a pneumatic conveyor machine 14 may be employed not only to blow the grain into the bag but also to inflate the bag. The pneumatic conveyor 14 is adapted to suck up grain and air into a suction or inlet pipe 16. The conveyor 14 discharges the grain and entraining air stream through a discharge pipe 18. An opening 20 may be formed at any desired point in the bag 10, preferably adjacent one corner of the bag, so that the discharge pipe 18 may be inserted into the bag. The stream of air from the conveyor 14 inflates the bag so that workmen may readily enter the bag to manipulate the discharge pipe. In this way, the grain may be spread evenly over the lower surface of the bag and built up into a neat pile. If desired, several openings may be formed in the bag so that the bag may be filled from different points around its edges.

The excess air from the discharge pipe 18 is allowed to escape through the opening 20 so as to prevent overinflation of the bag. The size of the opening 20 may be varied to regulate the inflation of the bag. In most cases, only a very small pressure is necessary to inflate the bag. Thus, the inflation pressure may be only a fraction of an inch of water.

It is sometimes necessary to take measures to prevent the inflated bag from being blown away or damaged by the wind. This is particularly true in the early stages of the filling of the bag, when only a small amount of grain is in the bag to weight it down. In the arrangement shown in FIG. 1, the bag 10 is protected against wind damage by means of a net 24 made of a plurality of crisscrossing ropes 26. The net 24 is spread over the bag and is suitably anchored to hold down the bag. Thus, the net may be anchored by tying weights 28 to the ends of the ropes 26. Sacks of cement or any other suitable objects may be employed as weights.

The illustrated conveyor 14 comprises a fan or blower 30 which is driven by a suitable engine or motor 32. The fan 30 sucks in air through a pipe 34 and discharges it into the discharge pipe 18. It will be seen that a separator 36 is connected between the inlet pipe 16 and the fan pipe 34 to separate the grain or other granular material from the incoming air. At the bottom of the separator 36, the grain is reintroduced into the discharge pipe 18 by a rotary air lock or feeder valve 38. The separator 36 may be of the cyclone type comprising a hopper 40 having a tangential inlet 42 and an upwardly extending axial outlet 44. The suction pipe 16 is connected to the inlet 42, while the outlet 44 is connected to the fan pipe 34. When the grain and the inrushing air enter the separator 36 through tangential inlet 42, a whirling motion is imparted to the grain so that the grain is forced outwardly as it travels downwardly in the hopper 40 by gravity. The air is withdrawn at the center of the separator so that centrifugal action prevents the grain from passing into the outlet 44. The separator 36 thus prevents the grain from passing through the blower 30.

When the plastic bag 10 has been filled with grain or other granular material, the discharge pipe 18 of the conveyor is withdrawn. The bag is sealed and a partial vacuum is established in the bag. The various openings in the bag, used for filling the bag, may be closed by heat sealing or cementing the plastic material or by using plastic zipper-type slide fasteners or other mechanical closures. It is generally convenient to establish the vacuum in the bag 10 by connecting the suction pipe 16 of the pneumatic conveyor 14 to the bag 10. The suction pipe 16 may be inserted into the bag through one of the remaining openings therein. A suitable screen 48 may be placed over the entrance to the suction pipe 16 to prevent any grain from being drawn into the suction pipe.

When the vacuum has been established in the bag 10, it may be maintained with a small vacuum pump or blower 50, which may be driven by a small motor 52. A suction hose or conduit 54 may extend from the vacuum blower 50 into the bag 10. The entrance to the suction hose 54 may take the form of a perforated screen section 56 so that grain will be excluded from the suction hose. The vacuum blower 50 may be of the type having an automatic vacuum switch for stopping the vacuum blower when the desired vacuum has been established, and for starting the blower when the level of vacuum diminishes below the desired level. By means of the small vacuum blower 50, the vacuum in the bag 10 is maintained through substantially the entire period that the grain is stored in the bag. Once the vacuum has been established, the suction pipe 16 of the pneumatic conveyor machine may be removed from the bag. The pneumatic conveyor may then be moved away for use at some other location. Thus, the conveyor 14 may be of the type mounted on wheels 58 for easy movement from place to place.

Any desired level of vacuum may be maintained by the vacuum pump 50. However, it has been found that effective preservation of the grain is obtained by maintaining a rather low level of vacuum, on the order of a few inches of water. Thus, in one test, the grain was preserved without any appreciable deterioration for about six months with a vacuum of only four inches of water.

The vacuum blower or pump 50 will maintain the vacuum in the bag 10, despite any small punctures, cuts or tears that might accidentally be produced in the bag. The vacuum pump is capable of removing air from the bag much faster than it can enter the bag through any small leaks. Such leaks may be detected by the sound of the inrushing air and may readily be patched by applying pressure-sensitive adhesive tape to the outside of the bag. Any other suitable patching material may be employed. The force of atmospheric pressure causes any patches to adhere firmly to the bag.

Due to the partial vacuum in the bag 10, the pressure of the surrounding atmosphere presses the limp flexible bag against the grain in the bag so as to eliminate any air space between the bag and the grain. The atmospheric pressure compresses and compacts the grain into a solid mass. Thus, the volume of air remaining in the grain is reduced to an absolute minimum. Only the small interstices between the grain kernels remain to be occupied by the air in the bag. Of course, the air pressure in such interstices is subatmospheric because of the action of the vacuum pump.

Because of the small amount of air remaining in the mass of grain, the oxygen in the bag is rapidlly consumed by the natural respiration of the grain. Moreover, the respiration of the grain increases the carbon dioxide content in the bag. The decrease in the oxygen level and the increase in the amount of carbon dioxide inhibit the growth of micro-organisms so that spoilage or deterioration of the grain is prevented.

If desired, an inert gas, such as carbon dioxide or nitrogen, for example, may be introduced into the bag to displace the oxygen. It is especially convenient to introduce carbon dioxide in the form of Dry Ice, which rapidly vaporizes and displaces the oxygen. In this way, the oxygen content in the bag may be reduced very quickly.

When a vacuum is maintained in the limp container, the surrounding atmospheric pressure compacts the grain so solidly that the air in the storage bag cannot circulate through the grain. Thus, it has been found that moisture does not migrate or condense in the bag. Such moisture migration and condensation have often been experienced in earlier types of grain storage facilities, due to fluctuations in the atmospheric temperature.

It has been found that rodents will not gnaw through or enter the storage bag as long as the partial vacuum is maintained therein. The rodents are apparently discouraged by the hardness of the bag and the underlying compacted mass of grain, when the bag is pressed against the grain by atmospheric pressure. Moreover, the formation of any tiny hole in the bag causes an inrush of air which is sufficient to frighten rodents away. As already indicated, any small holes may readily be patched with pressure sensitive adhesive tape or other suitable material.

The storage bag prevents any rain water or moisture from entering the bag or getting into the grain. As long as the vacuum is maintained, the bag will withstand extremely high winds because of the firm manner in which atmospheric pressure presses the bag against the grain. It has been found that the plastic storage bag easily withstands snow, sleet, hail and sub-zero atmospheric temperatures. In addition to its other virtues, the plastic storage bag prevents the grain from being contaminated by radioactive fall-out. It will be understood that radioactive fall-out comprises water droplets and dust particles containing radioactive material such as strontium 90. The plastic bag prevents any radioactive water or dust from getting into the grain. Any accumulation of radioactive particles on the bag may be brushed, washed, blown or otherwise removed from the surface of the bag before the grain is removed therefrom.

Various procedures may be employed for removing the grain from the bag or other limp container 10. The bag is so inexpensive that it may be regarded as being expendable, in which case the bag may be cut open to facilitate removal of the grain. The top wall of the bag may be cut free and removed from the grain, so that conventional mechanical handling equipment may be employed to transfer the grain to a mill, some other storage facility, or to a vehicle, such as a truck, railroad car or barge.

Figure 3:
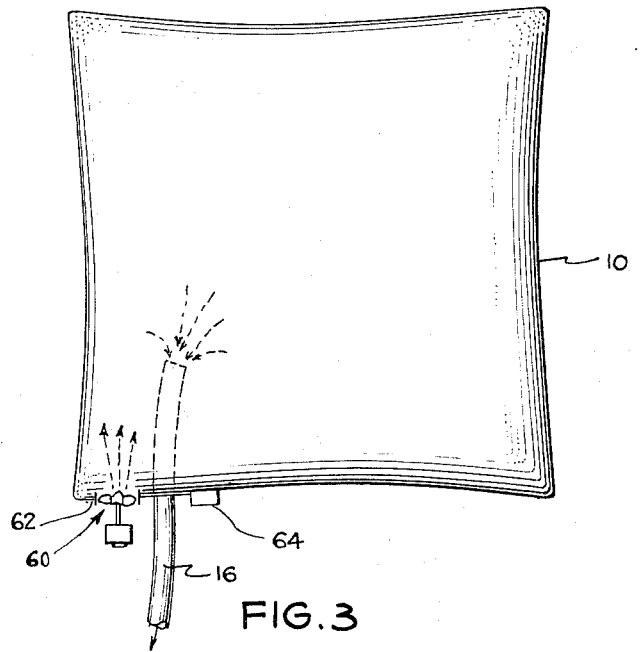
FIG. 3 is a view, similar to FIGS. 1 and 2, but showing an arrangement for removing the grain from the storage bag.
Figure 4:
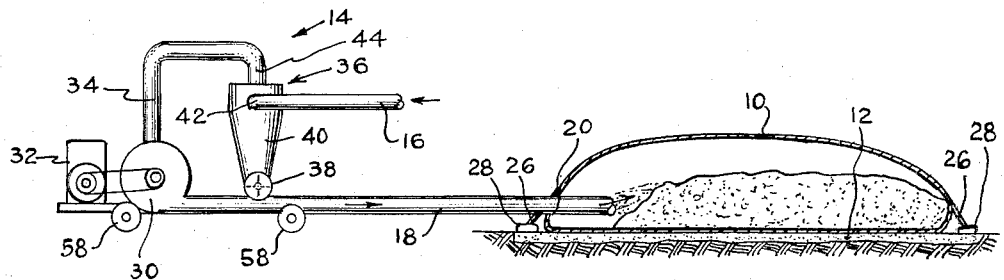
FIG. 4 is a diagrammatic cross-sectional view, taken generally along a line 4—4 in FIG. 1.
Figure 5:
FIG. 5 is a cross-sectional view, taken generally along a line 5—5 in FIG. 2.

If it is desired to save the bag for reuse, it is preferred to reinflate the bag so that the grain may readily be removed, as shown to advantage in FIG. 3. The bag 10 may be reinflated by means of an auxiliary fan or blower 60 which may be mounted in an opening 62 formed in one edge of the bag. Some of the air from the fan 66 is allowed to escape outwardly through the opening 62 so as to prevent overinflation of the bag 10. The size of the opening 62 may be varied to regulate the inflation of the bag. If desired, an automatic damper-type valve 64 may be mounted in the opening 62 to allow air to escape from the bag when the pressure therein rises above the desired value. In this way, overinflation of the bag 10 is prevented.

The pneumatic conveyor 14 may be employed to remove the grain from the bag 10. For this purpose, the suction pipe 16 of the pneumatic conveyor 14 is inserted into the bag through the opening 62. If desired, several openings may be formed in the bag so that the suction pipe 16 may be inserted into the bag at various points to facilitate the removal of the grain. The capacity and speed of the inflation fan 60 are chosen and regulated so that the fan will deliver a greater amount of air to the bag and the amount of air which is sucked into the suction pipe 16 of the pneumatic conveyor machine 14 when the grain is being removed. In this way, the bag 10 is kept inflated despite the withdrawal of air from the bag by the pneumatic conveyor machine. Normally, the fan 60 needs to develop only a very small air pressure to inflate the bag 10. Thus, the pressure involved is usually only a fraction of an inch of water.

FIGS. 1–5 illustrate the storage container for the grain or other granular material as being in the form of a large relatively flat bag supported on the ground. However, the storage container may assume various other forms. One such form is shown in FIG. 6, in which the storage container 68 comprises two flexible impervious sheets 70 and 72. The lower sheet 70 may be spread on the surface of the ground, preferably over a pad 74 of sand or the like. The grain or other granular material is then deposited in a large pile 76 on the sheet 70. The pile is covered with the upper sheet 72. In order to exclude moisture and air, the edges of the sheets are then connected or pressed together. Thus, the edges of the sheets may be heat sealed or cemented together. However, it is usually sufficient to press the edges of the upper sheet 72 against the lower sheet 70 with a ring-shaped mound 78 of sand, earth or the like. The seal may sometimes be improved by folding or rolling up the the edges of the sheets before they are weighted down by the mound of sand 78.

As in the case of the bag, the sheets 70 and 72 may be made of plastic film or any other suitable thin limp flexible material which is impervious to moisture and air. The sheet material need be only a few thousandths of an inch thick.

After the grain or other granular material has been piled on the sheet 70, and the container 68 has been completed by adding the upper sheet 72, a partial vacuum is established in the container, so that the pressure of the surrounding atmosphere will press the upper sheet 72 firmly against the grain. As before, the grain will be compressed and compacted into a solid mass. The vacuum may be established and maintained by means of a vacuum blower 80 connected to the container 68 by means of a suction pipe 82 which extends into the container through an opening 84 therein. In this case, the opening 84 extends through the upper sheet 72. However, it will be realized that the opening might be formed at the joint between the sheets 70 and 72. Within the container, the suction pipe 82 may terminate in a screen section 86 so as to prevent grain from being drawn into the vacuum blower.

If desired, a valve 88 may be connected into the suction pipe 82 adjacent the container 68. When the vacuum has been established in the container, the valve 88 may be closed so that the vacuum will be maintained while work is being done on the vacuum blower 80. In this case, a joint 90 is formed in the suction pipe 82 adjacent the valve 88 so that the vacuum blower 80 may readily be detached. It will be understood that initially the air may be withdrawn from the container 68 by a large machine such as the pneumatic conveyor 14. Once the vacuum has been established, it may be maintained by a smaller machine, such as the vacuum blower 80. Of course, the small blower 80 may be employed to establish the vacuum in the first instance, but this procedure will require more time to establish the vacuum.

The grain or other granular material may be removed from the storage container 68 by removing the upper sheet 72 and removing the grain from the pile 76. The sheet 72 may be removed progressively as the grain is removed so that the remaining grain will be protected from rain. Any desired mechanical equipment may be used to remove the grain. The plastic sheets are so inexpensive that no particular care need be exercised to save the sheets for reuse.

FIG. 7 illustrates another modified storage container 92 which is very similar to the container 68 of FIG. 6, except that the ground is hollowed out to form a pit or depression 94. The lower sheet 70 is employed to cover or line the walls of the pit 94. As before, the grain or other granular material is piled in and above the pit 94 and then is covered by the upper sheet 72. It will be recognized that a portion of the grain is stored below the ground level. This arrangement increases the storage capacity of the container 92 and tends to cool the grain by loss of heat to the ground.

Figure 8:
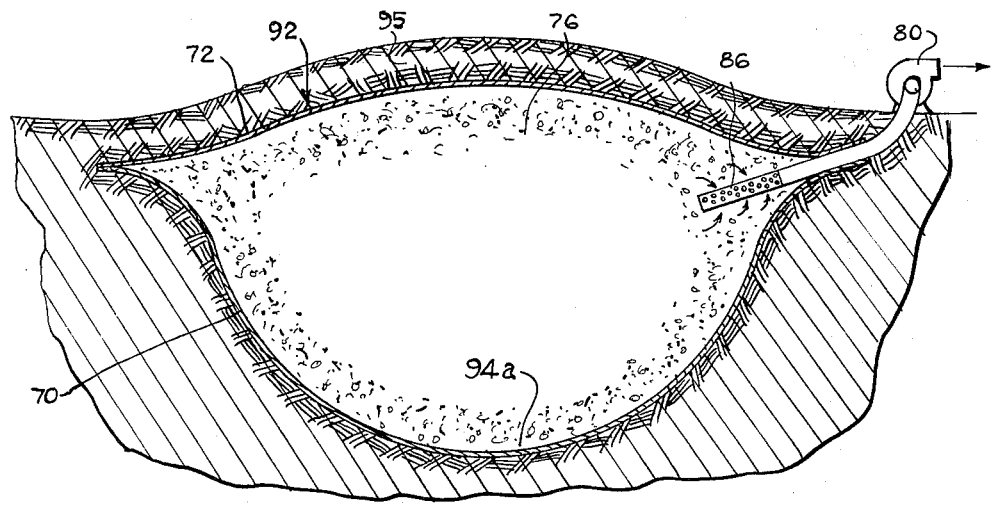
FIG. 8 is an elevational section of a modified arrangement, somewhat similar to that shown in FIG. 7, but in which the grain or other granular material is stored entirely underground.

FIG. 8 illustrates an arrangement which is quite similar to that shown in FIG. 7, except that the grain or other granular material is stored entirely underground. As before, the granular material is stored in a container 92 comprising lower and upper sheets 70 and 72 made of plastic film or other limp flexible impervious sheet material. Initially, a pit 94a may be dug in the ground. The lower sheet 70 may then be spread over the bottom of the pit and the grain or other granular material 76 may be deposited in a large pile on the sheet 70. Next, the pile of granular material is covered with the upper sheet 72, so as to complete the container 92. The edges of the sheets 70 and 72 may be heat sealed, cemented or otherwise joined together, or may simply be pressed together by piling earth upon the upper sheet 72.

As before, a partial vacuum may be established and maintained within the container 92 by connecting a vacuum blower or pump 80 thereto. When the vacuum has been established, the surrounding atmospheric pressure compacts the granular material so that the upper plastic sheet 72 presents a rather rigid surface. At this stage, the entire upper sheet 72 may be covered with a mound or bed of earth 95. The earth may be deposited on the upper sheet 72 with mechanical equipment, without damaging the plastic sheet, because of the rigidifying effect of the vacuum maintained within the limp container. Similarly, the covering earth may be removed with mechanical equipment when the grain or other granular material is to be removed from the container. The covering earth 95 provides especially effective protection against contamination of the grain or other granular material by radioactive fall-out. The earth prevents any fall-out particles from reaching the storage container. The covering earth also provides complete protection against damage to the container by hail, high winds and flying debris.

If desired, the limp flexible container may be supported by any suitable structure. Thus, FIG. 9 illustrates a container 98 which is supported within a bin or other structure 100. As shown, the container 98 takes the form of a large bag made of limp flexible impervious material, such as polyethylene, vinyl or other plastic film, various fabrics, or the like. The bag 98 serves as a liner within the structure 100 so that the structure itself need not be impervious to moisture and air. In fact, the structure may be quite a crude or elementary affair and may even be made of slats with spaces therebetween. The structure 100 prevents the grain or other granular material from spreading out into a relatively flat pile, so that the available ground area is used more efficiently. In many cases, the structure 100 may be an old or existing grain bin or the like.

While any conventional filling procedure may be employed, it is desirable to fill the bag 98 by inflating it and blowing grain or other granular material into the bag with a pneumatic conveyor machine as in the case of the method and apparatus illustrated in FIGS. 1–5. Once the bag 98 has been filled, the bag is sealed and air is withdrawn from the bag to establish a partial vacuum therein. The air may be withdrawn initially by means of a large vacuum blower 102, or by using the pneumatic conveyor machine 14. A suction pipe 104 extends from the blower into the bag 98. The pipe 104 may terminate in a screen section 106. In this case, a joint 108 is formed in the pipe 104 adjacent the blower 102 so that the blower may readily be detached. A valve 110 may be connected into the pipe or conduit 104. The valve 110 may be closed to prevent loss of vacuum when the large vacuum blower 102 is detached.

During the period of storage, the partial vacuum may be maintained in the bag 98 by a small vacuum blower or pump 112. A valve 114 may be connected between the vacuum pump 112 and the suction pipe 104. In this way, the valve 114 may be closed to prevent loss of the vacuum when the pump 112 is detached.

When the vacuum is established in the bag 98, the surrounding atmospheric pressure presses the bag 98 firmly against the grain and compacts the grain into a rather rigid mass. As before, the vacuum is maintained throughout substantially the entire period during which grain is stored in the bag 98.

By means of the arrangement of FIG. 9, grain or other granular material may be stored and preserved over a long period of time in existing storage facilities which are inadequate, in the absence of the present invention, to preserve the grain. In this way, existing facilities may be employed with greatly increased efficiency, yet with very little increase in cost.

The grain or other granular material may be removed from the bag 98 by inflating the bag and sucking out the grain or other granular material. Alternatively, an opening may be cut in the lower portion of the bag to provide for removal of the grain through a door or other opening in the lower portion of the structure 100. The bag is so inexpensive that no particular care need be taken to save it for reuse.

Figure 10:
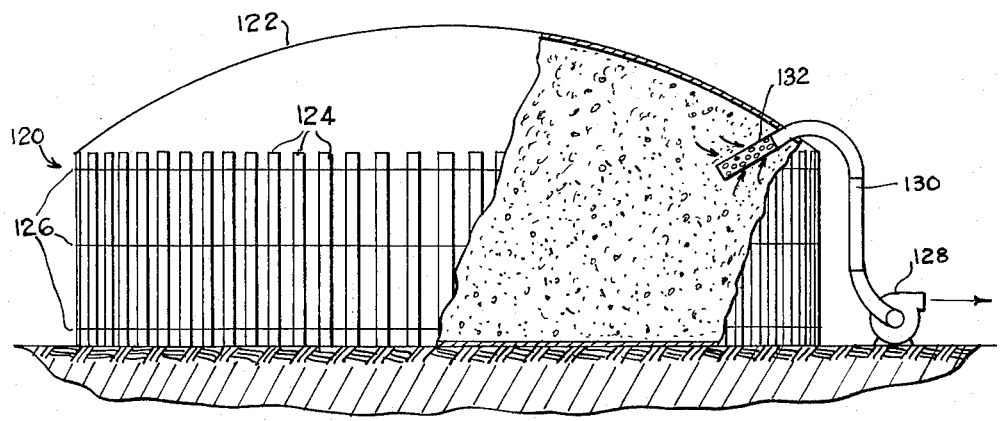
FIG. 10 is an elevational view, partly in section, of an arrangement whereby the limp storage bag or other container is supported within a temporary structure in the form of a slat-type fence.

FIG. 10 illustrates a modified arrangement utilizing a structure 120 in the form of a temporary fence which confines the limp storage container 122 while it is being filled with grain or other granular material. As shown, the fence 120 comprises a plurality of parallel pickets or slats 124 which are spaced around the entire container 122. The slats 124 are held together by means of a plurality of wires or other tension members 126 which encircle the entire container 122. Thus, the fence 120 may be similar in construction to a conventional slat-type snow fence.

The fence 120 supports the bag or other limp container 122 while the container is being filled with granular material. A partial vacuum is then established and maintained in the container by a vacuum blower or pump 128 which is connected to the container by a conduit 130. Within the container 122 the conduit 130 terminates in a screen section 132 which excludes granular material from the conduit 130.

When the vacuum is established, the surrounding atmospheric pressure compacts and rigidifies the granular material to such an extent that the fence 120 may often be removed and used again to set up another container. The force of atmospheric pressure prevents the container 122 from changing its shape when the fence 120 is removed. It will be recognized that the fence 120 prevents the granular material from spreading out, so that it may be piled higher than would otherwise be possible. The container 122 may be circular, oval, or any other desired or suitable shape.

Figure 11:
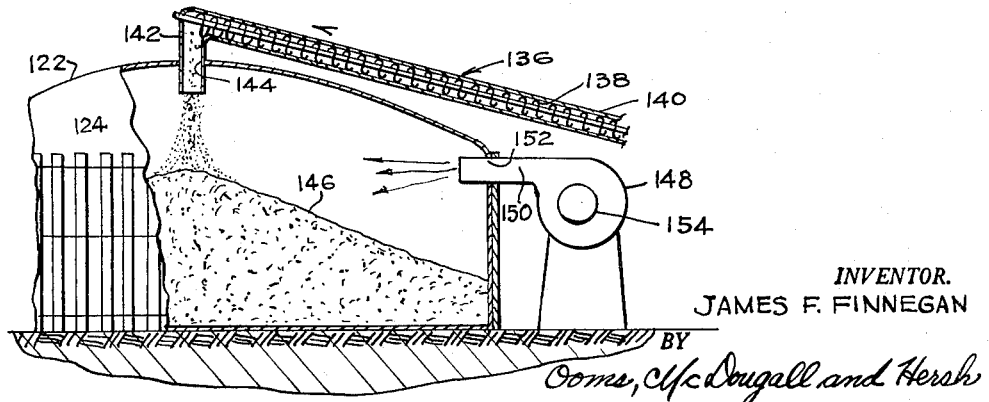
FIG. 11 is a fragmentary sectional view similar to FIG. 10, but showing a modified arrangement for filling the limp storage container.

It has already been stated that the limp storage container may be filled with granular material in any desired manner. Thus, any conventional or suitable equipment may be employed to convey or deliver the granular material into the storage container. FIG. 11 illustrates one suitable arrangement for filling the limp storage container 122 of FIG. 10. In this case, the granular material is delivered to the container 122 by means of any conventional or suitable conveyor 136. As shown, the conveyor 136 is of the screw type, having an auger 138 which is rotated within an elongated pipe or conduit 140. A spout or outlet pipe 142 extends into the central portion of the limp container 122 from the outer end of the conveyor 136. An opening 144 may be formed in the upper wall portion of the container 122 to admit the spout 142.

The filling of the limp container 122 may be facilitated by inflating the container with air so that it will be supported above the pile 146 of granular material which builds up as the container is filled. In this case, a separate fan or blower 148 is employed to inflate the limp container 122. An outlet pipe 150 extends from the fan 148 into the container 122, through an opening 152 therein.

The fan 148 needs to develop only a small air pressure to inflate the container 122, because of the lightness of the material of which the container is made. The openings 144 and 152 around the pipes 142 and 150 need not be sealed tightly, because normally the fan 148 will deliver sufficient air to make up for any leakage of air through these openings. It will be understood that any type of mechanical equipment may be employed to fill the limp container 122 while the container is inflated by the fan 148. When the container has been filled, the conveyor 136 may be removed. The opening 144 is closed by the use of a zipper-type closure, or some other mechanical closure, or by the use of cement or heat sealing operations. A partial vacuum may then be established in the container 122 by using the fan 148 or an auxiliary fan or blower, such as the blower 128 of FIG. 10. If the fan 148 is employed to establish the vacuum, the intake pipe 154 of the fan 148 is inserted into the container 122 through the opening 152, in place of the outlet pipe 150. Except as otherwise described, the arrangement of FIG. 11 may be the same as that of FIG. 10.

It will be recognized that the plastic bags or other limp flexible containers of the present invention are extremely low in cost. Moreover, they are extremely portable and easy to set up, even on the farm or at small isolated storage centers.

The present invention is especially useful for the storage of surplus grain. The maintenance of a partial vacuum in the limp storage container protects the grain against spoilage or deterioration, even if the grain has a rather high moisture content. Due to the vacuum, the surrounding atmospheric pressure compacts the grain and presses the limp container firmly against the grain, so that the container is protected from damage by the wind, hail, flying debris, rodents and other hazards.

The invention is also useful for the storage of hygroscopic materials, such as certain fertilizers and chemicals. The plastic or other impervious material of the storage container excludes rain and moisture and prevents the hygroscopic material from being damaged. It will be recognized that the present invention is applicable generally to the storage of granular materials under a variety of circumstances.

Various other modifications, alternative constructions and equivalents may be employed without departing from the true spirit and scope of the invention, as exemplified in the foregoing description and defined in the following claims.

I claim:

1. Means for handling and storing granular material, said means comprising a storage container made of limp flexible impervious sheet material, a pneumatic conveyor having a suction conduit, a discharge conduit, and means for sucking air and granular material into said suction conduit and for blowing air and granular material out of said discharge conduit, said discharge conduit being movable into said container for inflating said container and filling said container with granular material, said discharge conduit being movable out of said container when said container has been filled with granular material, said suction conduit thereupon being movable into said container for withdrawing air therefrom and establishing a partial vacuum therein, and a vacuum pump for maintaining the partial vacuum in said container, means for continuously connecting said vacuum pump to said container throughout the period of storage, the pressure of the surrounding atmosphere being effective to press the container against the granular material and to cause compaction of the granular material into a semi-rigid mass.

2. Means for handling and storing granular material, said means comprising a storage bag made of limp flexible impervious sheet material, a pneumatic conveyor having a suction conduit, a discharge conduit, and means for sucking air and granular material into said suction conduit and for blowing air and granular material out of said discharge conduit, said discharge conduit being movable into said bag for inflating said bag and filling said bag with granular material, said discharge conduit being movable out of said bag when said bag has been filled with granular material, said suction conduit thereupon being movable into said bag for withdrawing air therefrom and establishing a partial vacuum therein, a vacuum pump for maintaining the partial vacuum in said bag, means for continuously connecting said vacuum pump to said bag throughout the period of storage, the pressure of the surrounding atmosphere being effective to press the bag against the granular material and to compact the granular material, and a blower for reinflating said bag, said suction conduit of said conveyor machine being movable into said bag for removing the granular material therefrom while said bag is reinflated by said blower, said blower delivering air to said bag at a rate greater than the rate at which the air is removed from said bag by said conveyor machine.

3. A method of storing and protecting granular material, said method comprising, placing a quantity of granular material in a collapsible container made of a limp flexible impervious sheet material, initially withdrawing air from said container through an opening therein while substantially preventing leakage of air into said container to provide a partial vacuum therein, the surrounding atmospheric pressure being effective to press said container against the granular material therein so that the granular material is compacted, and subsequently pumping air from said container through an opening therein for substantially the entire period during which the granular material is stored therein and thereby continuously maintaining the partial vacuum in said container while withdrawing any gases or vapors evolved by the granular material.

4. A method of storing and protecting granular material, said method comprising, providing a bag made of a limp flexible impervious sheet material, blowing granular material into the bag in an entraining air stream, the air stream being effective to inflate the bag, the bag thereby being filled with granular material, initially withdrawing air from said bag through an opening therein while substantially preventing leakage of air into said bag to provide a partial vacuum therein, the pressure of the surrounding atmosphere being effective to press the bag against the granular material so that the granular material will be compacted, and subsequently pumping air from said bag through an opening therein and thereby maintaining the partial vacuum in said bag for substantially the entire period during which the granular material is stored therein.

5. A method of storing, protecting and reclaiming granular material, said method comprising, providing a bag made of a limp flexible impervious sheet material, blowing granular material into the bag in an entraining air stream, the air stream being effective to inflate the bag, the bag thereby being filled with granular material, initially withdrawing air from said bag through an opening therein while substantially preventing leakage of air into said bag to provide a partial vacuum therein, the pressure of the surrounding atmosphere being effective to press the bag against the granular material so that the granular material will be compacted, subsequently pumping air from said bag through an opening therein and thereby maintaining the partial vacuum in said bag for substantially the entire period during which the granular material is stored therein, reinflating said bag through an opening therein, and sucking the granular material from said bag through an opening therein.

6. A method of storing, protecting and reclaiming granular material, said method comprising, providing a bag made of a limp flexible sheet material and supported on the ground, blowing granular material into the bag in an entraining air stream, the air stream being effective to inflate the bag to provide working room therein, the bag thereby being filled with granular material, initially withdrawing air from said bag through an opening therein while substantially preventing leakage of air into said bag to provide a partial vacuum therein, the pressure of the surrounding atmosphere being effective to press the bag against the granular material so that the granular material will be compacted, subsequently pumping air from said bag through an opening therein and thereby maintaining the partial vacuum in said bag for substantially the entire period during which the granular material is stored therein, reinflating said bag by blowing air into said bag through an opening therein, and removing the granular material from said bag by sucking the granular material and entraining air therefrom through an opening therein, the inflating air being blown into said bag at a faster rate than the entraining air is sucked therefrom.

7. A method of storing and protecting granular material, said method comprising, providing a container made of a limp flexible impervious material, inflating said container with air, filling said container with granular material, initially withdrawing air from said container through an opening therein while substantially preventing leakage of air into said container to provide a partial vacuum therein, the surrounding atmospheric pressure being effective to press said container against the granular material therein so that the granular material will be compacted, and subsequently pumping air from said container through an opening therein and thereby maintaining the partial vacuum in said container for substantially the entire period during which the granular material is stored therein.

8. A method of removing a mass of granular material from storage within a container made of a limp flexible impervious sheet material, which container is larger than the volume of the mass of granular material, said method comprising: inflating said container by blowing inflating air into said container through an opening therein to lift the upper porton of said container away from the mass of granular material therein, inserting a suction conduit into said container through an opening therein, moving the suction conduit against the mass of granular material within said container, and withdrawing entraining air from said container through said suction conduit and thereby sucking up and carrying the granular material out of said container through said conduit, said inflating air being blown into said container continuously and simultaneously while said entraining air is being withdrawn from said container through said conduit, said inflating air being blown into said container at least as fast as the entraining air is withdrawn therefrom to maintain the inflation of said container while the granular material is being sucked therefrom.

References Cited by the Examiner
UNITED STATES PATENTS

| | | | |
|---|---|---|---|
| 2,228,609 | 1/41 | Ragni. | |
| 2,606,704 | 8/52 | Nichols | 99—189 |
| 2,609,134 | 9/52 | Korber | 53—112 |
| 2,628,907 | 2/53 | Darden | 99—171 |
| 2,667,421 | 1/54 | Parks | 99—171 |
| 2,672,268 | 3/54 | Bower | 99—189 |
| 2,690,778 | 10/54 | Walsh | 99—8 |
| 2,794,454 | 6/57 | Moulthrop | 141—67 |
| 2,815,621 | 12/57 | Carter | 53—22 |
| 2,896,385 | 7/59 | Gebhardt | 53—112 |
| 2,918,767 | 12/59 | Grinstead et al. | 53—112 |
| 2,935,233 | 5/60 | Vogt | 222—193 X |
| 2,947,147 | 8/60 | Johnson | 61—.5 |
| 2,956,839 | 10/60 | Hermanns | 222—193 X |
| 3,046,713 | 7/62 | Beiknap | 53—112 |
| 3,056,265 | 10/62 | Swinney | 61—.5 |
| 3,070,262 | 12/62 | Bottolfson | 220—18 X |

A. LOUIS MONACELL, *Primary Examiner.*

ABRAHAM H. WINKELSTEIN, *Examiner.*